United States Patent
Johansson

(10) Patent No.: US 9,937,926 B2
(45) Date of Patent: Apr. 10, 2018

(54) METHOD AND SYSTEM FOR ADAPTING PERFORMANCE

(71) Applicant: Scania CV AB, Södertälje (SE)

(72) Inventor: Björn Johansson, Älvsjö (SE)

(73) Assignee: Scania CV AB, Södertälje (DE)

( * ) Notice: Subject to any disclaimer, the term of this patent is extended or adjusted under 35 U.S.C. 154(b) by 0 days.

(21) Appl. No.: 15/100,959

(22) PCT Filed: Jan. 13, 2015

(86) PCT No.: PCT/SE2015/050014
§ 371 (c)(1),
(2) Date: Jun. 1, 2016

(87) PCT Pub. No.: WO2015/108470
PCT Pub. Date: Jul. 23, 2015

(65) Prior Publication Data
US 2016/0304094 A1    Oct. 20, 2016

(30) Foreign Application Priority Data
Jan. 15, 2014   (SE) .................................... 14500284

(51) Int. Cl.
*B60W 30/182* (2012.01)
*B60W 10/30* (2006.01)
(Continued)

(52) U.S. Cl.
CPC .......... *B60W 30/182* (2013.01); *B60W 10/06* (2013.01); *B60W 10/30* (2013.01);
(Continued)

(58) Field of Classification Search
USPC ....... 701/36; 123/564, 299, 383, 399, 41.12; 180/165, 65.21, 65.22, 65.25, 65.265
See application file for complete search history.

(56) References Cited

U.S. PATENT DOCUMENTS 5,186,081 A * 2/1993 Richardson ........... F02B 33/446
                                                    123/383
6,050,243 A * 4/2000 Nichols ................... F02D 41/22
                                                    123/479
(Continued)

FOREIGN PATENT DOCUMENTS

DE    102010053747 A1   6/2012
GB       2446407 A      8/2008
(Continued)

OTHER PUBLICATIONS

English translation of DE102010053747, Accessed Apr. 11, 2017 via EspaceNet.*

(Continued)

*Primary Examiner* — Krishnan Ramesh
(74) *Attorney, Agent, or Firm* — Moore & Van Allen PLLC; W. Kevin Ransom

(57) ABSTRACT

The present invention relates to a method and a system for adaptation of a vehicle's performance. This system comprises a receiving device arranged to receive a request that a driver of the vehicle wishes to use a temporary performance mode. The system also comprises a first initiation device arranged to initiate a use of a preparation mode based on the driver's request, where the vehicle, during such preparation mode, prepares the vehicle to use an increased fraction of the power, generated by the engine in the vehicle, for the propulsion of the vehicle. The system also comprises a second initiation device arranged to initiate a use of the temporary performance mode, wherein such temporary performance mode uses the increased fraction of the power generated, released by the preparation mode, to provide a temporary performance boost for at least one feature relating to the propulsion of the vehicle.

25 Claims, 4 Drawing Sheets

Figure 1:
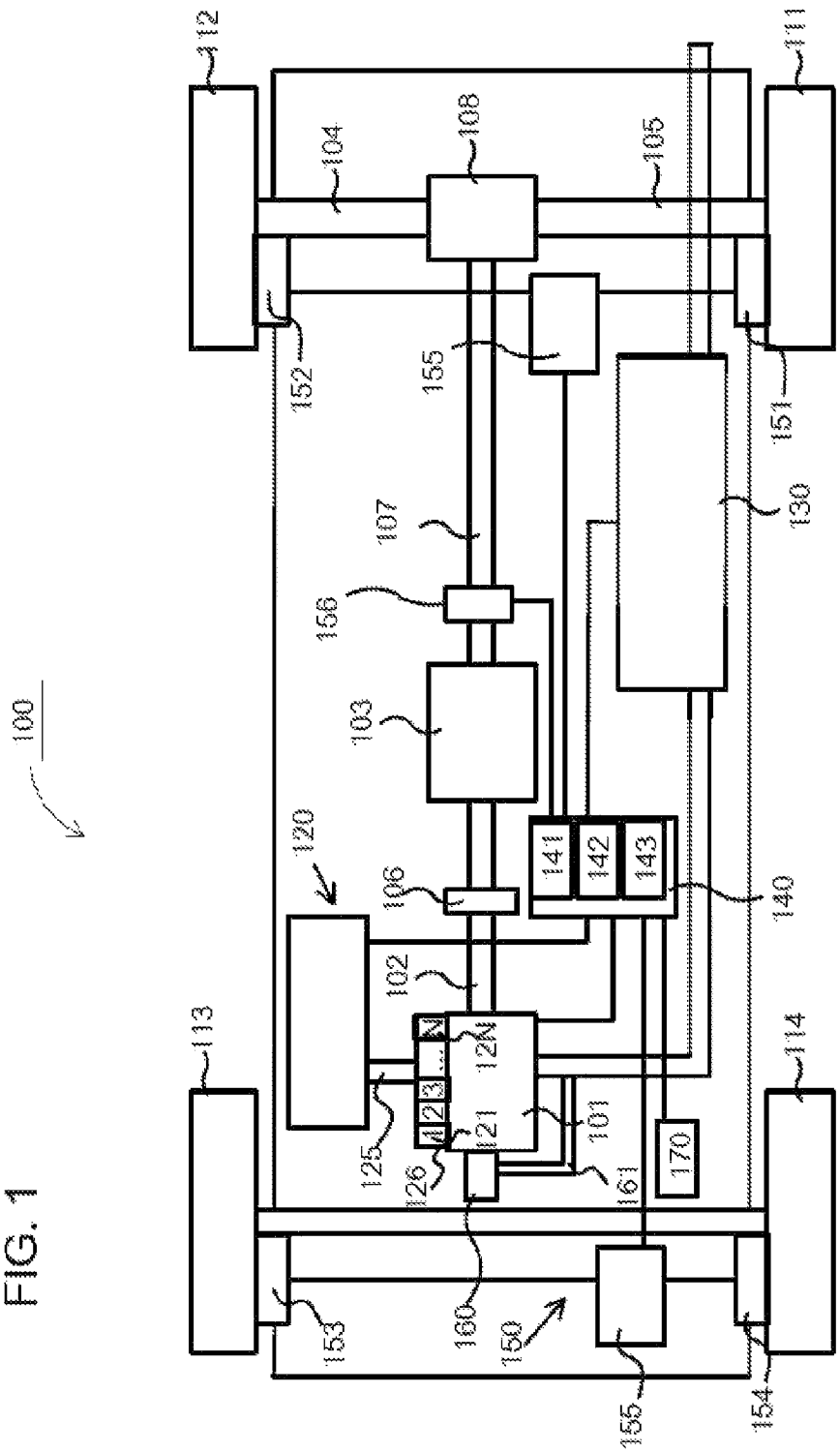

(51) Int. Cl.

| | | |
|---|---|---|
| *B60W 10/06* | (2006.01) | |
| *B60W 30/18* | (2012.01) | |
| *F02D 23/00* | (2006.01) | |
| *F01N 3/021* | (2006.01) | |
| *F01N 3/20* | (2006.01) | |
| *F01P 7/02* | (2006.01) | |
| *F01N 9/00* | (2006.01) | |

(52) U.S. Cl.
CPC ....... *B60W 30/18009* (2013.01); *F01N 3/021* (2013.01); *F01N 3/2006* (2013.01); *F01N 9/002* (2013.01); *F01P 7/02* (2013.01); *F02D 23/00* (2013.01); *B60W 2540/04* (2013.01); *B60W 2710/0638* (2013.01); *B60W 2710/0677* (2013.01); *B60W 2710/0688* (2013.01); *B60W 2710/10* (2013.01); *B60W 2710/184* (2013.01); *B60W 2710/244* (2013.01); *B60W 2710/30* (2013.01); *F01N 2900/1602* (2013.01); *Y02T 10/144* (2013.01)

(56) References Cited

U.S. PATENT DOCUMENTS

| | | | |
|---|---|---|---|
| 2007/0261648 A1* | 11/2007 | Reckels | F01P 7/167 123/41.12 |
| 2008/0228334 A1* | 9/2008 | Hashimoto | B60K 6/365 701/22 |
| 2008/0306670 A1* | 12/2008 | Masterson | B60K 6/26 701/99 |
| 2009/0024297 A1* | 1/2009 | Erol | F02D 11/105 701/102 |
| 2009/0069975 A1* | 3/2009 | Logan | H01M 10/44 701/36 |
| 2010/0138089 A1* | 6/2010 | James | B60K 6/46 701/22 |
| 2010/0242495 A1* | 9/2010 | DeMoss | F02C 9/28 60/801 |
| 2011/0005499 A1 | 1/2011 | Buckber et al. | |
| 2011/0015807 A1* | 1/2011 | Young | B60K 6/46 701/2 |
| 2011/0036086 A1* | 2/2011 | Liu | F02D 41/0007 60/602 |
| 2011/0192666 A1* | 8/2011 | Schmid | B60K 6/28 180/165 |
| 2011/0257867 A1* | 10/2011 | Walker | F02D 41/0007 701/103 |
| 2013/0179044 A1* | 7/2013 | Ishikawa | B60W 10/11 701/53 |
| 2015/0142234 A1* | 5/2015 | Hara | B60W 50/082 701/22 |
| 2015/0233304 A1* | 8/2015 | Hara | F02D 9/02 701/22 |

FOREIGN PATENT DOCUMENTS

| | | |
|---|---|---|
| GB | 2502805 A | 12/2013 |
| JP | H0476220 A | 3/1992 |
| JP | 2006336646 A | 12/2006 |
| JP | 2011111948 A | 6/2011 |
| JP | 2012207636 A | 10/2012 |
| KR | 1020090004777 A | 1/2009 |
| WO | 2007025319 A2 | 3/2007 |
| WO | WO 2007025319 A2 | 3/2007 |
| WO | WO2011148050 A2 | 12/2011 |
| WO | 2013168779 A1 | 11/2013 |

OTHER PUBLICATIONS

International Search Report for PCT/SE2015/050014 dated Apr. 5, 2015.
Written Opinion of the International Searching Authority for PCT/2015/050014 dated Apr. 25, 2015.
Korean Intellectual Property Office Notice of Office Action for Patent Application No. 10-2016-7021537 dated Aug. 10, 2017.
Extended European Search Report and European Search Opinion dated Aug. 9, 2017 for PCT/SE2015050014.

* cited by examiner

METHOD AND SYSTEM FOR ADAPTING PERFORMANCE

CROSS-REFERENCE TO RELATED APPLICATIONS

This application is a national stage application (filed under 35 § U.S.C. 371) of PCT/SE2015/050014, filed Jan. 13, 2015 of the same title, which, in turn, claims priority to Swedish Application No. 1450028-4, filed Jan. 15, 2014 of the same title; the contents of each of which are hereby incorporated by reference.

FIELD OF THE INVENTION

The present invention relates to a method, system, and computer program product for adaptation of performance of a vehicle using a temporary performance mode using an increased fraction of power to provide a temporary performance boost to the vehicle.

BACKGROUND OF THE INVENTION

The following background description constitutes a description of the background to the present invention, and thus need not necessarily constitute prior art.

Vehicles have a performance that is limited in one or several ways for one or several reasons. One limitation may consist of an available performance for hardware in the vehicle, such as for example a power, which an engine in the vehicle may provide. A hardware limitation of performance may often be motivated by cost reasons, since for example an engine providing a higher power is more expensive to purchase, and/or operate, than an engine providing a lower power. It may also be necessary to introduce a hardware limitation of performance in order to comply with applicable laws and/or regulations, such as for example threshold values for permitted exhaust emissions, where exhaust treatment systems, the component parts of which purify exhausts, on the one hand, and reduce the vehicle's performance, on the other hand, are used.

A performance limitation may also consist of a software limitation of performance. Here, for example, the engine power may be limited, the injection may be controlled, and/or the exhaust purification may be controlled in order to produce, for example, a lower fuel consumption or lower exhaust emissions. Accordingly, software limitations may also be made for example for cost reasons, and/or in order to comply with applicable laws and/or regulations.

BRIEF DESCRIPTION OF THE INVENTION

In certain driving modes it may be a disadvantage, or even unsuitable in terms of traffic safety, that the performance for the vehicle is limited in the manner described above, for example in an overtaking situation, or when the vehicle is driven uphill.

In addition, the limitations may be perceived as disrupting by a driver of the vehicle. Generally, many drivers today want as high a performance as possible in the vehicle they drive, which is partly due to the fact that a higher performance facilitates a safer and better driving of the vehicle. There is also a more irrational reason why drivers want a high performance for the vehicle, namely that it feels more pleasant, fun, and/or more interesting for the driver to drive a vehicle with higher performance than a vehicle with lower performance.

One alternative to obtain this performance sought is to purchase a vehicle having an engine with a higher power, or replacing the existing engine with a more powerful engine. This alternative is costly, however, for example with respect to purchasing a vehicle and engine, respectively, and in relation to the fuel consumption.

It is therefore one objective of the present invention to provide a method and a system for adaptation of performance for a vehicle, which at least partly solves these problems.

This objective is achieved through the above-mentioned method in accordance with the characterizing portion of claim 1. The objective is also achieved through the above-mentioned system according to the characterizing portion of claim 20, and the above-mentioned computer program and computer program product.

According to the present invention an adaptation of the performance of a vehicle may be made temporarily, if one or several conditions are met, and if the driver has indicated a desire that the driver wants to use an adapted performance. The adapted performance is used during a temporary performance mode for the vehicle, where such temporary performance mode comprises a temporary adjustment of one or several set-points and/or parameters in one or several of the respective systems in the vehicle.

Before a temporary performance mode is initiated in the vehicle according to the present invention, a preparation mode is initiated, which is created to prepare the vehicle, later, that is to say during the temporary performance mode which is initiated after the preparation mode is completed, to be able to use an increased fraction of an output generated by the engine for driving the vehicle. According to different embodiments of the invention, the preparation method comprises an earlier activation of at least one auxiliary system in the vehicle, such as for example comprising a refilling of at least one energy storage means in the auxiliary system. According to other embodiments of the invention other types of activations are displaced in time, so that they occur during the preparation mode.

The idea is that activities consuming power generated by the engine, where the power could otherwise have been used for the propulsion of the vehicle, are performed earlier so that they are performed during the preparation mode. Thus, the risk of these power consuming activities having to be carried out during the temporary performance mode following the preparation mode is reduced. This means that it will be possible, to a greater extent than in prior art solutions, to use the power generated by the engine during the temporary performance mode for the propulsion of the vehicle. The use, according to the present invention, of a preparation mode before the temporary performance mode, also means that it will be possible for the temporary performance mode to extend for a longer time period than would have been possible, if the preparation period had not preceded the performance mode.

In the temporary performance mode, which follows the preparation mode, the increased fraction of the power generated by the engine, which is released through the preparation mode used by the invention, is then used combined with an adjustment of one or several set-points and/or parameters for one or several of the respective systems in the vehicle, whereby such one or several adjustments of set-points and/or parameters provide a temporary performance boost for at least one feature related to the propulsion of the vehicle.

The temporary performance mode is ongoing for a limited time period $t_{performance\_mode}$ which is adapted to meet the average value requirement relating to emissions and/or strength limitation for at least one component in said vehicle (100).

According to different embodiments of the invention, during the temporary performance mode, for example set-points and/or parameters related to combustion efficiency, smoke limitation, pilot strategies, engine temperatures, cylinder pressure and/or engine torque curves may be adjusted. The adjustment of these set-points and/or parameters is described in further detail below.

Different embodiments of the present invention specify the conditions for when a driver and/or a vehicle may be granted permission to use a temporary performance mode. These conditions may for example be satisfied when the driver/vehicle is granted a reward, for example because the driver has driven the vehicle in a manner which is, in some respect, suitable. The conditions may also be satisfied if an applicable performance mode is ordered/paid in advance, or at game-like set-ups. Temporary performance modes may also be used for marketing purposes, for example to grant a driver the possibility of testing how it feels to drive a vehicle with a higher performance than the driver's current vehicle, such as a vehicle with a more powerful engine.

The engine temperature parameter/set-point may be mentioned as a non-limiting example of how the invention may be used to increase the vehicle's performance temporarily. In order to avoid overheating, engines today are controlled so that they do not becomes warmer than a predetermined maximum temperature threshold value $T_{max\_eng}$ for the engine. However, friction in the engine decreases at higher temperatures. Hence, when the engine is warm, a smaller part of the torque generated at combustion is consumed to operate the engine, compared to when the engine is cold. According to one embodiment of the present invention this potential, somewhat lower, friction loss is used in a controlled manner by, for a limited time period, that is to say during the temporary performance mode, increasing the value of the predetermined maximum temperature threshold value $T_{max\_eng}$. The controlled utilization of the maximum temperature for the engine comprises that the limited time period $t_{performance\_mode}$ for the utilization, that is to say the duration of the temporary performance mode, is given a value, ensuring that the maximum temperature does not result in excessive wear of the hardware, which in this case comprises at least the engine.

In order to further ensure that as large a part as possible of the power generated during the performance mode may be used for the propulsion of the vehicle, at least one energy storage means relating to the engine temperature may be replenished during the preparation mode, which in this non-limiting example may comprise that the cooling fan in the vehicle's cooling system is activated. Thus, energy storage devices relating to the cooling system and/or the engine temperature will be replenished, that is to say the temperature will decrease during the preparation mode. When the preparation mode later is completed and followed by an initiation of the temporary performance mode, the engine temperature is relatively low, which means that the cooling fan will not be needed to cool the engine during the temporary performance mode.

The cooling fan consumes a relatively large part of the temporary power, often as much as for example 5%-10% of the power. By ensuring that this power is used for the propulsion of the vehicle during the temporary performance mode, instead of operating the cooling fan, and at the same time allowing an increase of the predetermined maximum temperature threshold value $T_{max\_eng}$ for the engine, according to the present invention a longer temporary performance mode, with a higher available power used for the propulsion of the vehicle, may be provided by the present invention compared to prior art solutions.

Other activities comprised in the preparation mode and/or other adjustments of set-points and/or parameters during the temporary performance mode, which are carried out according to different embodiments of the invention, may in a corresponding manner provide an improved performance of the vehicle, as described in more detail below.

BRIEF LIST OF FIGURES

Figure 2:
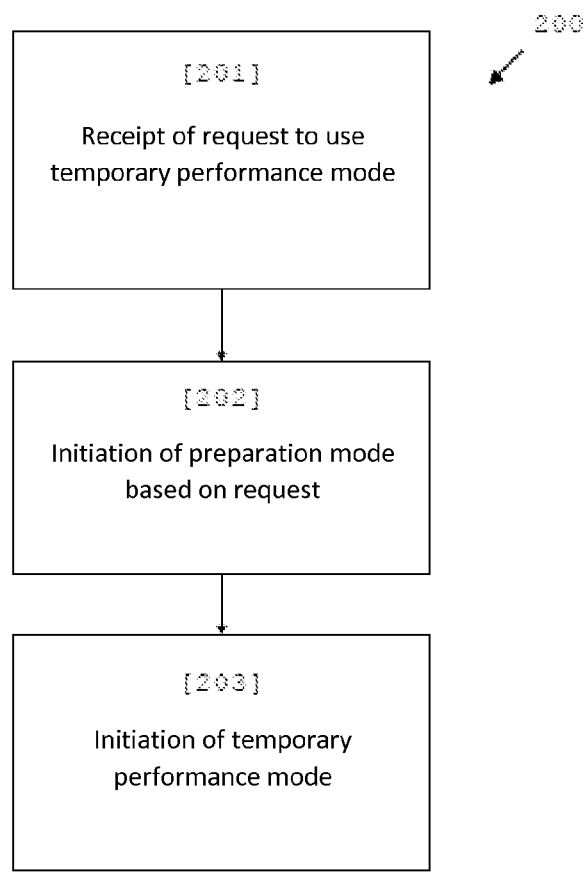
Figure 3:
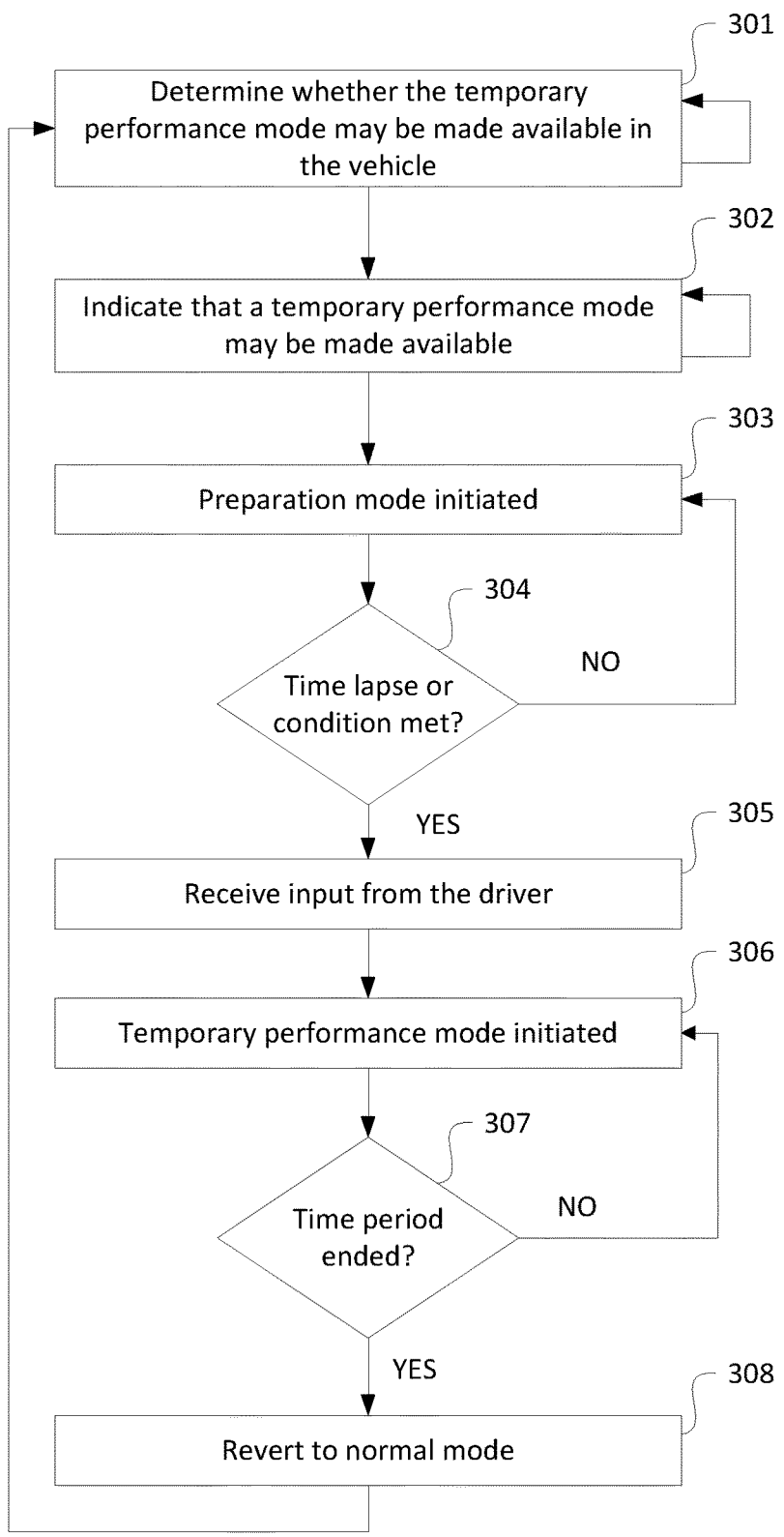
Figure 4:
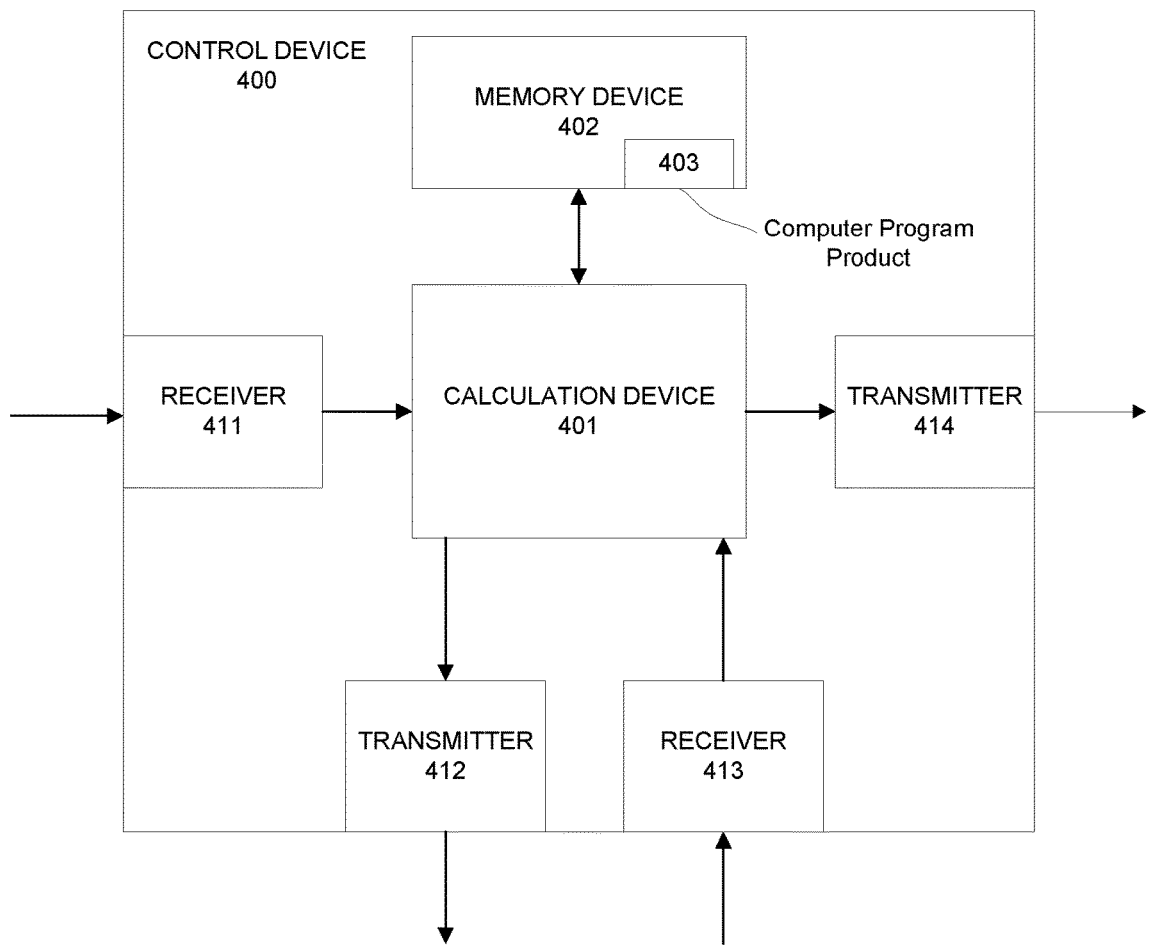

The invention will be illustrated in more detail below, along with the enclosed drawings, where similar references are used for similar parts, and where:

FIG. 1 shows an example vehicle in which the present invention may be implemented, FIG. 2 shows a flow chart for the method according to the invention, FIG. 3 shows a method according to different embodiments of the present invention, and FIG. 4 shows a control device according to the present invention.

DESCRIPTION OF PREFERRED EMBODIMENTS

In this document, the present invention is both exemplified and described mainly for a vehicle. However, a person skilled in the art will realize that the invention may be implemented and used in essentially all devices with an engine system, e.g. a ship or airborne vessels.

FIG. 1 shows schematically an example vehicle 100, which may comprise the present invention. The vehicle 100, which may be a passenger car, a truck, a bus or another vehicle, comprises a driveline, which conveys power to driving wheels 111, 112 in the vehicle 100. The vehicle 100 also comprises additional wheels 113, 114, which may be driving or non-driving and may be arranged for control of the vehicle. The driveline comprises one combustion engine 101 which, in a customary manner, via an output shaft 102 on the combustion engine 101, is connected to a gearbox 103 via a clutch 106. Naturally, the vehicle's driveline may also be of another type, such as a type with a conventional automatic gearbox, of a type with a hybrid driveline, etc.

The combustion engine 101 is powered by fuel, which is supplied by a fuel system 120, comprising among others one or several fuel tanks and devices 125, which transport the fuel from the fuel tanks to the engine 101, and a fuel injection system 126, which is arranged to inject fuel into the engine's cylinders with a number N of injection elements 121 . . . 12N, where N may e.g. be the number 5, 8, 12 or another suitable number for the number of cylinders in the engine 101. The devices for fuel transport 125 are here displayed very schematically, but may comprise e.g. one or several conduits for transport of the fuel within the vehicle, one or several pumps, which may be divided into low and high pressure circuits, and which create a pressure in the fuel supplied to the injection elements 121 . . . 12N, filters, couplings, and other devices for fuel transport.

The combustion engine also needs supply of air to the engine's cylinders. For this purpose, a turbo charger 160 may be arranged in connection with the engine 101. The turbo charger 160 is operated in a prior art manner by way of exhausts from the engine rotating a turbine wheel, whereby the air to the engine's cylinders is compressed before it is supplied to the cylinders.

The combustion engine 101 is controlled by the vehicle's control system via a control device 140, which is schematically illustrated in FIG. 1. The fuel system 120 is controlled by the vehicle's control system via a control device 140, which in FIG. 1 is schematically illustrated as the same control device controlling the combustion engine 101, but which may also be arranged separately from this control device 140.

The fuel is thus injected into the engine's cylinders by a fuel injection system 126 comprising one injection element, also called an injector, per cylinder. The injection element may e.g. be supplied with fuel by a common rail device, which supplies pressurized fuel to all the injection elements, or by separate devices with pressurized fuel to the respective injection device.

An output shaft 107 from the gearbox 103 operates the wheels 111, 112 via a final drive 108, e.g. a customary differential, and the drive shafts 104, 105 connected to said final drive 108.

Exhausts created by the engine 101 during its combustion of the fuel are purified by an exhaust treatment system 130 before they are released from the vehicle. The exhaust treatment system may here consists of any suitable exhaust treatment system that provides an acceptable exhaust purification. There is a number of such exhaust treatment systems 130 in the market today. One example of an exhaust treatment system that may satisfy the emission standards for EuroVI is described briefly below, but the present invention may be applied for substantially all types of exhaust treatment systems in a corresponding way.

In one example of a EuroVI-system, the exhaust stream is led to a diesel particulate filter (DPF) via a diesel oxidation catalyst (DOC). During the combustion in the combustion engine, soot particles are formed, and the particulate filter DPF is used to catch these soot particles. The exhaust stream is led through a filter structure in the particulate filter, where soot particles are caught from the exhaust stream passing through, and are stored in the particulate filter DPF.

The oxidation catalyst DOC has several functions and is normally used primarily in the exhaust purification to oxidize remaining hydrocarbons $C_xH_y$, and carbon monoxide CO in the exhaust stream into carbon dioxide $CO_2$ and water $H_2O$. The oxidation catalyst DOC may also oxidize a large fraction of the nitrogen monoxides NO present in the exhaust stream into nitrogen dioxide $NO_2$. The oxidation of nitrogen monoxide NO into nitrogen dioxide $NO_2$ is important to the nitrogen dioxide based soot oxidation in the filter, and is also advantageous at a potential subsequent reduction of nitrogen oxides $NO_x$.

For the reduction of nitrogen oxides $NO_x$ the exhaust treatment system also comprises an SCR (Selective Catalytic Reduction)-catalyst, arranged downstream of the particulate filter DPF. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted by the ratio between nitrogen monoxide NO and nitrogen dioxide $NO_2$ in the exhaust stream, so that the reduction's reaction is impacted in a positive direction by the previous oxidation of NO into $NO_2$ in the oxidation catalyst DOC. The exhaust treatment system 130 may also be equipped with a slip-catalyst ASC, which is arranged to oxidize an excess of ammonia that may remain after the SCR-catalyst.

The exhaust treatment system 130 is controlled by the vehicle's control system via a control device 140, which in FIG. 1 is schematically illustrated as the same control device controlling the combustion engine 101, but which may also be arranged separately from this control device 140.

The vehicle 100 also comprises various different brake systems 150. The brake systems 150 may comprise a customary service brake system 155, which may e.g. consist of wheel brakes 151, 152, 153, 154 comprising brake discs and/or brake drums with associated brake pads, or similar devices arranged in connection with the vehicle's wheels 111, 112, 113, 114. The brake system 150 may also comprise one or several auxiliary brakes, for example a brake 156 which acts on the vehicle's powertrain, such as a retarder, an electromagnetic brake, a decompression brake, or an exhaust brake. A retarder may comprise one or several of a primary retarder, placed between the engine and the gearbox, and a secondary retarder, placed after the gearbox. An electromagnetic brake may be placed in any suitable place where it may act on the vehicle's powertrain.

The brakes 156 acting on the powertrain are here schematically illustrated as acting on the output shaft 107 of the gearbox. However, such brakes 156 may be arranged substantially anywhere along the vehicle's powertrain, and may act substantially anywhere where a braking effect may be achieved.

The fuel system 150 is controlled by the vehicle's control system via a control device 140, which in FIG. 1 is schematically illustrated as the same control device controlling among others the combustion engine 101, but which may also be arranged separately from this control device 140.

As described in more detail below, the system's control device 140 comprises a receiving device 143, a first initiation device 141 and a second initiation device 142, which are used to implement the present invention. The receiving device 143 and the first 141 and second 142 initiation devices are illustrated in FIG. 1 as separate units. However, the functions for these devices may also be implemented in fewer devices, e.g. one and the same device, as a person skilled in the art will realize. The control device 140 may be comprised in, or cooperate with, an EMS (Engine Management System) circuit in the vehicle, or another suitable circuit in the vehicle.

As a person skilled in the art will realize, the control device 140 may also be installed to control one or several further devices in the vehicle, such as for example the clutch 106 and/or the gearbox 103 (not displayed in the figure).

The vehicle 100 may also comprise one or several devices 170 for input and/or indication/provision of information to the driver, which may be connected to a control device 140 in the vehicle. The input devices may for example comprise a push-button, a lever, a pedal, a lever and/or a touch screen. The indication devices may for example comprise a lamp, a display, a pointer, a selection in a driver interface, a loudspeaker, a touch screen and/or a display. As a person skilled in the art will realize, devices for indication of information to the driver may have substantially any suitable design, provided that some type of information may be indicated/provided to the driver in some way. Similarly, the devices for input of information may have substantially any suitable design, provided that some type of information may be supplied to the system and/or the control device by the driver in some way.

FIG. 2 shows a flow chart for the method 200 according to the present invention, where an adaptation of the performance of a vehicle is adapted if one or several conditions are satisfied.

In a first step 201 of the method according to the present invention, a request is received that a driver of the vehicle wishes to use a temporary performance mode. Such a request may for example be received through the use of an input device 170 in the vehicle, as described in further detail below.

In a second step 202 of the method according to the present invention a use of a preparation mode is initiated, based on the request by the driver. Such preparation mode is defined in such a way that the vehicle, during the preparation mode, prepares the vehicle to be able to later, that is to say after the completion of the preparation mode, use an increased fraction of a power generated by the engine 101, for the propulsion of the vehicle. This may also be described as activities consuming power generated by the engine being carried out during the preparation mode, whereas such power would otherwise have been used for the propulsion of the vehicle. Since such power consuming activities are carried out during the preparation mode, the activities will very likely not need to be carried out after the preparation mode, so that it will be possible to use the greater part of the power generated by the engine 101 for the propulsion of the vehicle, after the preparation mode is completed.

According to one embodiment of the invention, the preparation of the vehicle during the preparation mode comprises an earlier activation of at least one auxiliary system in the vehicle, where the activation is brought forward in time, so that the auxiliary system is activated during the preparation mode. Such an activation of at least one auxiliary system may here, for example, comprise a replenishment of at least one energy storage means in the auxiliary system, as described in further detail below.

In a third step 203 of the method according to the present invention, a use of the temporary performance mode is initiated, which the driver indicated in the first step 201 that the driver wishes to use. During such temporary performance mode, the increased fraction of the power generated by the engine 101, which is released through the preparation mode, is used in the method's second step 202 to provide a temporary performance boost for at least one feature related to the propulsion of the vehicle. The activities that may herein may be carried out during such temporary performance mode in order to be able to use, to as great an extent as possible, the power generated by the engine 101 for the propulsion of the vehicle, is described in more detail below.

The temporary performance mode is ongoing for a limited time period $t_{performance\_mode}$, which is adapted to meet the average value requirement relating to emissions, and/or strength limitation, for at least one component in said vehicle (100).

FIG. 3 shows a method 300 according to different embodiments of the present invention, for which the above mentioned receipt of the request in the first step 201 is preceded by at least an indication in a driver interface, that the temporary performance mode may be made available. The method 300 displayed in FIG. 3 shows an example of how the present invention may be implemented in the system and/or the control device 140, and is also used to describe different embodiments of the invention. However, the use of these different embodiments is not limited to following the flow chart displayed in FIG. 3, since the embodiments may generally be used for the invention, for example as described in FIG. 2.

In a first step 301 of the method, it is determined whether the temporary performance mode may be made available in the vehicle, by way of a determination of whether one or several conditions for such temporary performance mode have been satisfied. If one or several conditions have been satisfied, the method continues to a second step 302, but if none of the conditions are satisfied, the method reverts to the first step 301 of the method.

One condition that may be used to determine whether or not the available performance mode may be made available in the vehicle, may be related to whether a predetermined time has lapsed since a temporary performance mode was last initiated. Thus, if the vehicle/driver has not used the temporary performance mode during a predetermined time period, permission may be granted to use it again. Such predetermined time period may have a suitable length, which may be empirically calculated and/or determined.

Temporary performance modes may also be paid/ordered in advance, and may then be available for use in the vehicle, that is to say they may be vehicle specific, or they may be available for use by the driver, that is to say they may be driver specific. Accordingly, it may be possible to purchase temporary performance modes, which may then be used on suitable occasions, for example when the vehicle reaches a road section with long and/or steep uphill slopes, or if the vehicle needs to overtake vehicles ahead.

Prepaid performance modes could also be used to reduce the vehicle owner's purchase cost of a vehicle. If for example a vehicle is nearly exclusively driven in flat terrain, and/or carries out lighter transports and only on rare occasions is used for heavy transports and/or driven in hilly terrain, the owner would not be forced, thanks the use of the embodiment, to purchase a powerful vehicle adapted for such hilly terrain and/or the heavy cargo. The owner could instead purchase a weaker and cheaper vehicle, well adapted for a flat terrain and light cargoes, and purchase a suitable number of prepaid/ordered temporary performance modes, which may be used when a need for a more powerful vehicle arises. This would overall be cheaper for vehicle owners whose vehicles need to use temporary performance modes relatively infrequently.

Temporary performance modes may also be centrally allocated and may then be available for use in the vehicle, that is to say they may be vehicle specific, or may be available for use by the driver, that is to say they may be driver specific. This embodiment may for example be used as marketing of more powerful models of the vehicle, than the vehicle the driver is currently driving. Many parts of the hardware in modern vehicles is the same for different models of the vehicle, wherein the performance for the respective model is determined through applied limitations carried out with the help of software in the vehicle. It is therefore possible, by way of adjustments of the software, to temporarily increase the performance of a vehicle. Accordingly, a vehicle manufacturer and/or a vehicle seller, for example, may let a driver try out how a more powerful model of a vehicle behaves, and what it feels like to drive it.

Temporary performance modes may also be used as different types of vehicle specific or driver specific rewards. For example, a vehicle and/or a driver may be granted one or several temporary performance modes if a vehicle has been driven in a manner that satisfies a condition. If the vehicle has been driven, for example, with a low fuel consumption during a time period or within a road section, the driver and/or the vehicle may be granted one or several temporary performance modes. Similarly, the driver and/or the vehicle may be granted one or several temporary performance modes if the vehicle has been driven in a manner that results in low wear of one or several components in the vehicle, or that results in a sought speed for a time period or within a road section, or a sought arrival time. The driver may also be granted a temporary performance mode if the driver selects the shortest and/or most economical route.

Generally, temporary performance modes may be used as vehicle specific or driver specific rewards to control the driver's behavior, so that it is consistent with the wishes of, for example, the vehicle's owner or the driver's employer.

Similarly, granting of temporary performance modes may be used as vehicle specific or driver specific rewards at for example driver training, where the driver is rewarded with a temporary performance mode when the driver has performed well during the training.

Temporary performance modes may also be used as vehicle specific or driver specific map-related rewards, if such conditions are satisfied. For example, the vehicle and/or the driver may then be granted a temporary performance mode if the vehicle/driver is the first in a vehicle fleet to reach a certain position on the map. The vehicle and/or the driver may also be granted a temporary performance mode when the vehicle driver reaches the position of a certain destination.

Temporary performance modes may also be used as vehicle specific or driver specific rewards in game-like set-ups. Such game-like set-ups may have a number of different focuses. For example, a driver may be allocated a temporary performance mode if the driver correctly answers, in a quiz-like set-up, several questions relating to the driver's vehicle, traffic rules and/or driving strategies.

In a second step 302 of the method it is indicated, for example with the use of the indication- and/or input-device 170, that a temporary performance mode may be made available since at least one condition has been satisfied in the first step 301. If the driver makes an input that signals to the system and/or the control device 140 that the driver is interested in using the available performance mode, the method continues to a third step 303, otherwise the method waits for such an input from the driver and remains in the second step 302.

In the third step 303 of the method, the preparation mode is initiated, which results in an earlier activation of at least one auxiliary system in the vehicle, so that the activation occurs during the preparation mode. These auxiliary systems may for example comprise cooling fans, generators, compressors.

The activation of auxiliary systems may here result in, for example, a replenishment of at least one energy storage means in the auxiliary system. Thus, the idea is that the energy storage means must be as full as possible before the available performance mode is initiated.

Activation of the auxiliary systems may also result in a cooling of an engine 101, or in a cooling of a brake system, such as of a retarder in the vehicle. The cooling system's cooling fan uses a lot of energy if it needs to be activated. It is therefore very advantageous to cool the engine and/or the brake system before the available performance mode is initiated, in order thus to avoid using the cooling fan during the temporary performance mode itself.

Activation of auxiliary systems may, according to one embodiment, result in a down-shift in the gearbox 103, impacting a number of auxiliary systems and replenishments of energy storage means. A down-shift results in a higher engine speed for the engine. Many auxiliary systems, as well as the replenishment of energy storage means, are engine speed dependent in such a way that the replenishment of the energy storage device is faster at a lower engine speed. For example, a battery is charged faster by the generator at a higher engine speed. Pumps, such as for example compression pumps, operate more efficiently at a higher engine speed. The rotation speed for the cooling fan in the cooling system is often also engine speed dependent, which means that a greater flow of cooling air, and accordingly a greater cooling of, for example, the engine system is obtained at a higher engine speed than at a lower engine speed.

The activation of the auxiliary system may according to one embodiment result in charging of at least one battery in the vehicle.

Activation of auxiliary systems may, according to one embodiment, result in deactivation of a compressor arranged for the generation of compressed air in the vehicle. Such compressed air is typically stored in a suitable pressure container and may be used by different systems in the vehicle, for example in brake systems, in climate control systems, and/or to control dampers or similar elements in the engine 101. The compressor may therefore also be comprised in the respective systems, such as in the brake system, in the climate control system, or in an engine system in the vehicle. A compressor arranged in the climate control system is used to operate a heat exchanger in the climate control system, which means that the energy storage means that is being replenished is a cooling storage means.

The activation of the auxiliary systems, may according to one embodiment, result in an activation of a temperature controller comprised in a climate control system in the vehicle.

The activation of the auxiliary systems may, according to one embodiment, result in a regeneration of a particulate filter in an exhaust treatment system in the vehicle. Particulate filters may be clogged by particles in the exhaust stream, such as soot particles, so that a regeneration of the particulate filter is necessary in order to ensure its exhaust purifying function. There are both passive and active regenerations of the particulate filter. According to the embodiment, bringing a potential regeneration forward in time to the preparation mode ensures that no regeneration needs to be carried out in the subsequent temporary performance mode. The regeneration may be activated by adding fuel to the exhaust stream, heating the particulate filter when it burns.

The activation of the auxiliary systems may, according to one embodiment, result in a heating of a reduction catalyst, such as an SCR-catalyst, in an exhaust treatment system 130. Accordingly, the reduction catalyst's efficiency for the reduction of nitrogen oxides $NO_x$ may be increased during the preparation mode and during the subsequent temporary performance mode, since the preheated catalyst's $NO_R$-conversion is more efficient at higher temperatures.

Overall, the idea behind the early activation of one or several auxiliary systems during the preparation mode is that the vehicle, following the preparation mode, should have energy storage means which are as fully replenished as possible, so that the power generated by the engine may, to as great an extent as possible, be used to move the vehicle forward, instead of being used by the auxiliary systems during the temporary performance mode. The power provided for the propulsion of the vehicle during the temporary performance mode may thus be maximized.

The method remains in the preparation mode until a timer and/or a condition reaches a predetermined value in the fourth step 304 of the method. In other words, the preparation mode continues for a time period with a predetermined length $T_{prep}$, or until one or several conditions have been met. Such a condition may be related to a replenishment level for an energy storage means, so that the preparation mode continues until a certain replenishment level has been achieved in the energy storage means. Another such condition may be related to a temperature threshold value for one or several components in the vehicle, so that the preparation mode continues until the temperature threshold value has been achieved for the one or several components. Subsequently, the method continues to a fifth step 305, comprising that the system receives an input from the driver, for example through the use of an indication and/or input device 170 in the vehicle, which signals to the system that the driver wishes to initiate the temporary performance mode.

In a sixth step 306 of the method, the temporary performance mode is initiated, comprising the use of one or several activities which achieve a temporary performance boost for at least one feature related to the vehicle's propulsion.

According to one embodiment of the present invention, a temporary performance boost is achieved by way of adjustment of a combustion strategy for the engine 101, such adjustment being carried out to provide a more efficient combustion in the engine 101. Accordingly, the engine 101 may provide increased power. Additionally, the use of the preparation mode before the temporary performance mode means that an increased fraction of the power emitted by the engine is used for the propulsion of the vehicle 100. Accordingly, a powerful increase in performance is achieved here, since both the power provided and the use of the provided power are optimized for the propulsion of the vehicle.

The more efficient combustion may in some cases give rise to an increased production and/or increased emissions of nitrogen oxides $NO_x$. This may, however, be acceptable for a short time according to the inventive idea, since the emission standards may still be met if the average value is within the applicable threshold values. A higher value for emissions within a limited time window may thus be used, as long as the emissions before and/or after this time window are low enough for the average value to be within the threshold values. An increased production of nitrogen oxides $NO_x$ for a temporary and limited time period may also, according to one embodiment, be handled by adding more additives, such as for example urea, in the exhaust treatment system. Since such increased dosage only continues for a limited time, lumps and other potential problems relating to the increased dosage do not result in any lasting problems. Additionally, the engine's fuel consumption drops during the more efficient combustion.

The more efficient combustion may, according to different embodiments, be achieved in a number of different ways. For example, a change of an injection angle for one or several of the injection elements 121 . . . 12N may be made, where the angle at which the fuel is injected into the engine's cylinders is changed, and a more efficient combustion may be obtained.

Suitable changes of the injection angle may be obtained by simulation, for example, and/or be determined by way of tests/trials, so that a more efficient combustion may be obtained through the change.

A more efficient combustion may also be achieved by way of control of an EGR-valve (EGR-damper) 161, which is schematically displayed as a recycling of exhausts to the engine's air intake side in FIG. 1. If the recirculation achieved with the EGR-damper 161 is reduced, this results in a higher engine power. Additionally, the use of the preparation mode before the temporary performance mode means that an increased fraction of the power emitted by the engine is used for the propulsion of the vehicle 100, which results, overall, in a substantial increase in performance.

The more efficient combustion may also be achieved by way of a change in pressure of the fuel injected into the engine's cylinders. Accordingly, the fuel injection system 126 and/or the fuel system 120 creates a pressure change, for example a pressure increase, which means that the engine power increases when the fuel is injected into the cylinders by the fuel injection devices 121 . . . 12N and burned. Combined with the power optimization resulting from the use of the preparation mode, this embodiment provides a performance boost for the vehicle.

A more efficient combustion may also be achieved by way of a change in the charge air pressure of the air being pressed into the engine's cylinders. Accordingly, the turbocharger 160 is controlled, for example, to increase the charge air pressure of the air supplied to the engine, which means that the engine power increases when the fuel in the cylinders burns. Combined with the power optimization resulting from the use of the preparation mode, this embodiment provides a performance boost for the vehicle.

The temporary performance mode may also comprise a temporary suspension of smoke management in the vehicle 100. At for example gear shifts and/or acceleration of the vehicle, the turbocharger effect provided by the turbocharger 160 may have a time lag, which may entail that too much fuel is injected into the cylinders in relation to the air being pressed into the cylinders. Smoke management is therefore used in vehicles in order to limit, based on the availability of air in the cylinders, fuel injection into the cylinders, to ensure that the formation and emission of particles during combustion is kept within reasonable limits. According to the embodiment, such smoke management may thus be temporarily deactivated to obtain an increased acceleration at gear shifts, since the particle emission dependent torque limitation, produced by the smoke management, is turned off, resulting in a considerable performance boost for the vehicle. For vehicles with particulate filters in the exhaust treatment system, the increased number of particles in the exhaust stream, which may potentially result from the deactivation of the smoke management, is caught by the particulate filter. Accordingly, the emissions do not significantly deteriorate, while the particulate filter is encumbered with more soot. An increased amount of soot in the filter does not constitute a significant problem provided it lasts for a brief time period, which is the case with the embodiment.

In relatively many vehicles today, so-called pilot injections are used to reduce the noise level resulting from the combustion in the engine's cylinders. The noise level may be reduced by way of a fuel injection (pilot) carried out before the main fuel injection, that is to say the fuel injection that operates the engine, occurs in the cylinders. According to one embodiment of the invention, the temporary performance mode may comprise a temporary change of this pilot strategy. Accordingly, a performance boost, which in this case also comprises a changed engine noise composition, may be obtained. Thus, the engine noise will be sharper, which is perceived by a driver and/or passenger as the noise of a more powerful engine. Threshold values pursuant to acoustic legislation should be taken into consideration at the adjustment of the pilot strategy.

The temporary performance mode may also be achieved by allowing a higher temperature than what is normally allowed for the engine 101. This may be achieved by raising a maximum temperature threshold value $T_{max\_eng}$, for the engine 101. Since the engine is allowed to become warmer than normal, the use of the cooling fan in the cooling system of the vehicle is also reduced. Accordingly, the part of the torque generated by the engine, previously used to operate the cooling fan, may instead be used for the propulsion of the vehicle. Thus, the reduced use of the fan means that the fan uses less power than if the maximum temperature threshold value $T_{max\_eng}$ would have had a normal, lower value, that is to say than if the embodiment had not been used. Increased values for the maximum temperature threshold value $T_{max\_eng}$ may result in greater temperature variations, which may impact the wear of the hardware. However, the increased wear, which could potentially be the result of an increased engine temperature, is negligible for a limited time period according to the embodiment, and in any case acceptable in relation to the improved combustion and performance. The increased engine temperature also means that friction losses in the engine drop.

According to one embodiment, the temporary performance mode may comprise permission to use of a higher cylinder pressure in at least one cylinder in the engine. Here, the cylinder pressure may thus be allowed to increase, so that the pressure exceeds a construction threshold value for a shorter time period. The strength of the engine and/or other components in the powertrain is not jeopardized, since the higher cylinder pressure may only be used for a limited and sufficiently brief time period according to the embodiment, wherein the length of the time period depends on strength parameters for the engine and/or the cylinders.

According to one embodiment the temporary performance mode may comprise permission for an adjustment of a curve for a maximum allowable torque for the engine 101, wherein such adjustment may, at least partly, consist of raising the curve, that is to say an increase of one or several values for the maximum allowable torque. This embodiment borders on the above described embodiment, for which the cylinder pressure is allowed to increase. The strength of the engine and/or other components in the powertrain is not jeopardized at a temporary and temporarily limited raising of the curve, wherein the length of the time period with at least partly increased values may be contingent on the strength parameters for the engine and/or cylinders.

For example, components in the powertrain, such as the gearbox 103, may be allowed, for a limited time period, to exceed threshold values for the gearbox, by way of raising the cylinder pressure and/or the torque curve, since this occurs in a controlled manner by way of the invention, ensuring that the gearbox is not damaged.

The temporary performance mode continues until a timer reaches a predetermined value in the seventh step 307 of the method. In other words, the temporary performance mode continues for a time period with a predetermined length $T_{performance\_mode}$, whereat such predetermined length $T_{performance\_mode}$ may be related to emission requirements relating to exhausts over time, and/or strength limitations of one or several components in the vehicle. The predetermined length $T_{performance\_mode}$ may also be linked to an interruption condition, depending on whether an energy storage means reaches a certain replenishment level, or whether a component in the vehicle reaches a certain temperature. The present invention uses the fact that emission standards and strength limitations often provide average values over a relatively long time period. This means that such standards and limitations may be exceeded for brief periods, provided that the average value is within the applicable threshold values. The present invention uses this, in order to temporarily boost performance during the temporary performance mode. It is therefore important that the duration of the temporary performance mode does not exceed a limited time period $t_{performance\_mode}$.

After such predetermined length $T_{performance\_mode}$, the method moves to an eight step 308, which means that the vehicle and/or the engine reverts to a normal mode, comprising normal uses of the engine 101 and of the auxiliary systems in the vehicle. Subsequently, the system starts over with the first step 301, verifying whether one or several conditions have been satisfied.

The present invention may be implemented in the software, e.g. in the control device 140, which means that the contribution to the vehicle's complexity and/or manufacturing cost is minor.

A person skilled in the art will realize that a method to adapt the performance of a vehicle according to the present invention may also be implemented in a computer program, which when executed in a computer will cause the computer to execute the method. The computer program usually consists of a part of a computer program product 403, where the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals. These input and output signals may contain wave shapes, pulses or other attributes, which may be detected as information by the devices 411, 413 for the receipt of input signals and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment displayed, is implemented in the control device 400. The invention may, however, also be implemented wholly or partly in one or several other control devices already existing in the vehicle, or in a control device dedicated to the present invention.

According to one aspect of the present invention, a system is provided, which is arranged to adapt the performance of a vehicle 100. Such system comprises a receiving device 143, which is arranged to receive 201 a request that a driver of the vehicle 100 wishes to use a temporary performance mode.

The system also comprises a first initiation device 141, which is arranged to initiate 202 a use of a preparation mode based on the driver's request, wherein the vehicle 100, during such preparation mode, prepares the vehicle, as described above, to be able to use an increased fraction of the power generated by the engine 101 in the vehicle, for the propulsion of the vehicle. As described in more detail above, during the preparation mode, energy storage means in various auxiliary systems may, for example, be replenished.

The system also comprises a second initiation device 142, which is arranged to initiate 203 a use of the temporary performance mode, wherein such temporary performance mode uses the increased fraction of the power generated, released by the preparation mode, to provide a temporary performance boost for at least one feature relating to the propulsion of the vehicle. As described above, a more efficient combustion in the engine may be achieved, for example, by way of different embodiments of the present invention. The use of the preparation mode before the temporary performance mode ensures that a large part of the energy, generated by the engine during the preparation mode's more efficient combustion, may be used for the propulsion of the vehicle, since auxiliary systems need only minimal activation during the temporary performance mode.

The temporary performance mode is ongoing for a limited time period $t_{performance\_mode}$, which is adapted to meet the average value requirement relating to emissions, and/or strength limitation for at least one component in said vehicle (100).

The system according to the present invention may also comprise at least one input device 170 and/or at least one indication device 170.

The system is also, in order to be able implement the different embodiments of the invention, set up to control one or several from among the group:
a system for cooling of the engine 101;
a system for cooling of the braking system 150;
the gearbox 103;
a generator arranged to charge at least one battery in the vehicle;
at least one compressor for generation of compressed air in the vehicle;
a temperature control comprised in a climate control system in the vehicle;
a system for regeneration of the particulate filter in the exhaust treatment system 130;
a system for heating of a reduction catalyst in the exhaust treatment system 130;
the fuel injection system 126;
the EGR-damper/valve 161;
the turbocharger 160;
a system for smoke management in the vehicle;
at least one temperature threshold value for the engine 101;
at least one threshold value for the cylinder pressure in the engine 101; and
at least one maximum allowable torque for the engine 101.

A person skilled in the art will also realize that the above system may be modified according to the different embodiments of the method according to the invention. In addition, the invention relates to a motor vehicle 100, for example a truck or a bus, comprising at least one system for adaptation of a vehicle's performance.

The present invention is not limited to the embodiments of the invention described above, but pertains to and comprises all embodiments within the scope of the enclosed independent claims.

The invention claimed is:

1. A method for adaptation of a vehicle's performance, comprising:
receipt of a request that a driver of said vehicle wishes to use a temporary performance mode;
initiation of a use of a preparation mode based on said request, wherein said vehicle, during said preparation mode, performs one or more activities that consume a power generated by an engine in said vehicle, so that the one or more activities do not occur during said temporary performance mode; and
initiation of a use of said temporary performance mode, wherein said temporary performance mode uses an increased fraction of a power to provide a temporary performance boost, for at least one feature relating to said propulsion of said vehicle, wherein said temporary performance boost continues for a limited time period $t_{performance\_mode}$, which is adjusted to meet an average value standard for emissions and/or an average value strength limitation for at least one component in said vehicle.

2. A method according to claim 1, wherein said preparation of said vehicle comprises an earlier activation of at least one auxiliary system in said vehicle, wherein said earlier activation occurs during said preparation mode.

3. A method according to claim 2, wherein said activation of said at least one auxiliary system comprises a replenishment of at least one energy storage means in said auxiliary system.

4. A method according to claim 2, wherein said activation of said at least one auxiliary system comprises one or several from among the group:
a cooling of an engine in said vehicle;
a cooling of a brake system in said vehicle;
a down-shift in a gearbox in said vehicle;
charging of at least one battery in said vehicle;
an activation of a compressor for the generation of compressed air in said vehicle;
an activation of a compressor comprised in a brake system in said vehicle;
an activation of a compressor comprised in a climate control system in said vehicle;
an activation of a temperature controller comprised in a climate control system in said vehicle; and
a heating of a reduction catalyst in an exhaust treatment system in said vehicle.

5. A method according to claim 2, wherein said activation of said at least one auxiliary system comprises a regeneration of a particulate filter in an exhaust treatment system in said vehicle.

6. A method according to claim 1, wherein said receipt of said request is preceded by at least one indication in a driver interface that said temporary performance mode may be made available.

7. A method according to claim 1, wherein said temporary performance mode may be made available if one or several conditions are met from among the group:
- a predetermined time has lapsed since a temporary performance mode was last initiated;
- at least one prepaid temporary performance mode is available for use by said vehicle;
- at least one prepaid temporary performance mode is available for use by a driver of said vehicle;
- at least one centrally allocated temporary performance mode is available for use by said vehicle;
- at least one centrally allocated temporary performance mode is available for use by a driver of said vehicle;
- at least one reward is available for use by said vehicle, wherein said reward is granted if said vehicle has been driven in a manner that satisfies a condition; and
- at least one reward is available for use by a driver of said vehicle, wherein said reward is granted if said vehicle has been driven in a manner that satisfies one condition.

8. A method according to claim 1, wherein said temporary performance mode comprises an adjustment of a combustion strategy for said engine, toward a more efficient combustion in said engine, to achieve that said increased fraction of said power generated by said engine is used for the propulsion of said vehicle.

9. A method according to claim 8, wherein said more efficient combustion is achieved by way of one or several activities from among the group:
- a change of an injection angle for a fuel injection in said engine;
- a reduction of a recirculation achieved with an EGR-damper in said vehicle;
- a change in pressure of fuel injected into the cylinders of said engine; and
- a change in charge air pressure of the air supplied to the cylinders of said engine.

10. A method according to claim 1, wherein said temporary performance mode comprises a suspension of a smoke management in said vehicle, to achieve that said increased fraction of said power generated by said engine is used for the propulsion of said vehicle.

11. A method according to claim 1, wherein said temporary performance mode comprises an adjustment of a combustion strategy, used for a fuel injection into said engine, to achieve that said increased fraction of said power generated by said engine is used for the propulsion of said vehicle, and to alter the sound of the engine.

12. A method according to claim 1, wherein said temporary performance mode comprises a permission for a higher temperature of said engine, to achieve that said increased fraction of said power generated by said engine is used for the propulsion of said vehicle.

13. A method according to claim 12, wherein a maximum temperature threshold value $T_{max\_eng}$ for said engine is increased.

14. A method according to claim 12, wherein a use of a cooling fan in said vehicle is reduced, by way of said permission for a higher temperature of said engine.

15. A method according to claim 1, wherein said temporary performance mode comprises a permission for use of a higher cylinder pressure in at least one cylinder in said engine, to achieve that said increased fraction of said power generated by said engine is used for the propulsion of said vehicle.

16. A method according to claim 1, wherein said temporary performance mode comprises a permission for an adjustment of a maximum allowable torque for said engine.

17. A method according to claim 16, wherein said adjustment of said maximum allowable torque consists of increasing at least one value for said maximum allowable torque.

18. A computer program product for adaptation of a vehicle's performance, said computer program product comprising a program code stored on a non-transitory computer readable medium, wherein, when said program code is executed in a computer, said program code causes said computer to:
- receive a request that a driver of said vehicle wishes to use a temporary performance mode;
- initiate use of a preparation mode based on said request, wherein said vehicle, during said preparation mode, performs one or more activities that consume a power generated by an engine in said vehicle, so that the one or more activities do not occur during said temporary performance mode; and
- initiate use of said temporary performance mode, wherein said temporary performance mode uses an increased fraction of a power to provide a temporary performance boost, for at least one feature relating to said propulsion of said vehicle, wherein said temporary performance boost continues for a limited time period $t_{performance\_mode}$ which is adjusted to meet an average value standard for emissions and/or an average value strength limitation for at least one component in said vehicle.

19. A system arranged for adaptation of a vehicle's performance, comprising:
- a receiving device arranged for receipt of a request that a driver of said vehicle wishes to use a temporary performance mode;
- a first initiation device, arranged for the initiation of a use of a preparation mode based on said request, wherein said, during said preparation mode, performs one or more activities that consume a power generated by an engine in said vehicle, so that the one or more activities do not occur during said temporary performance mode;
- a second initiation device, arranged for the initiation of a use of said temporary performance mode, wherein said temporary performance mode uses an increased fraction of a power to provide a temporary performance boost, for at least one feature relating to said propulsion of said vehicle, wherein said temporary performance boost continues for a limited time period $t_{performance\_mode}$, which is adjusted to meet an average value standard for emissions and/or an average value strength limitation for at least one component in said vehicle.

20. A system according to claim 19, wherein said system comprises one or several from among the group:
- at least one input device; and
- at least one indication device.

21. A system according to claim 19, wherein said system is to control one or several from the group of:
- a system for cooling of an engine in said vehicle;
- a system for cooling of a brake system in said vehicle;
- a gearbox in said vehicle;
- a generator arranged for charging of at least one battery in said vehicle;
- at least one compressor for generation of compressed air in said vehicle;

a temperature controller comprised in a climate control system in said vehicle;

a system for regeneration of a particulate filter in an exhaust treatment system in said vehicle;

a system for heating of a reduction catalyst in an exhaust treatment system in said vehicle;

a fuel injection system in said vehicle;

an EGR-damper in said vehicle;

a turbocharger in said vehicle;

a system for smoke management in said vehicle;

at least one temperature threshold value for an engine in said vehicle;

at least one threshold value for cylinder pressure in an engine in said vehicle; and at least one maximum allowable torque for an engine in said vehicle.

22. A method for adaptation of a vehicle's performance, comprising:

receipt of a request that a driver of said vehicle wishes to use a temporary performance mode;

initiation of a use of a preparation mode based on said request, wherein said vehicle, during said preparation mode, prepares said vehicle to later be able to use an increased fraction of a power, generated by an engine in said vehicle, for the propulsion of said vehicle; and initiation of a use of said temporary performance mode, said temporary performance mode comprises a permission for a higher temperature of said engine to achieve said increased fraction of said power generated by said engine, wherein said temporary performance mode uses said increased fraction of said power to provide a temporary performance boost, for at least one feature relating to said propulsion of said vehicle, wherein said temporary performance boost continues for a limited time period $t_{performance\_mode}$, which is adjusted to meet the average value standard for emissions and/or strength limitations for at least one component in said vehicle.

23. A method according to claim 22, wherein a maximum temperature threshold value $T_{max\_eng}$ for said engine is increased.

24. A method according to claim 22, wherein a use of a cooling fan in said vehicle is reduced, by way of said permission for a higher temperature of said engine.

25. A method for adaptation of a vehicle's performance, comprising:

receipt of a request that a driver of said vehicle wishes to use a temporary performance mode;

initiation of a use of a preparation mode based on said request, wherein said vehicle, during said preparation mode, prepares said vehicle to later be able to use an increased fraction of a power, generated by an engine in said vehicle, for the propulsion of said vehicle; and initiation of a use of said temporary performance mode, said temporary performance mode comprises a permission for use of a higher cylinder pressure in at least one cylinder in said engine to achieve said increased fraction of said power generated by said engine, wherein said temporary performance mode uses said increased fraction of said power to provide a temporary performance boost, for at least one feature relating to said propulsion of said vehicle, wherein said temporary performance boost continues for a limited time period $t_{performance\_mode}$, which is adjusted to meet the average value standard for emissions and/or strength limitations for at least one component in said vehicle.

* * * * *